United States Patent
Mintz

[11] Patent Number: 6,078,812
[45] Date of Patent: Jun. 20, 2000

[54] SYSTEM AND METHOD FOR ADAPTIVE CHANNEL ALLOCATION

[75] Inventor: Yaron Mintz, Dallas, Tex.

[73] Assignee: Ericsson Inc., Research Triangle Park, N.C.

[21] Appl. No.: 08/990,439

[22] Filed: Dec. 15, 1997

[51] Int. Cl.[7] .............................. H04Q 7/00; H04B 3/60; H04B 17/00; H04B 1/18

[52] U.S. Cl. .............................. 455/434; 455/62; 455/63; 455/161.1

[58] Field of Search ............................... 455/62, 63, 67.3, 455/450, 452, 509, 161.1, 161.2, 561, 562, 434

[56] References Cited

U.S. PATENT DOCUMENTS

| | | | |
|---|---|---|---|
| 4,389,732 | 6/1983 | Sasahara et al. | 455/160 |
| 4,989,230 | 1/1991 | Gilling et al. | 379/59 |
| 5,023,900 | 6/1991 | Tayloe et al. | 379/32 |
| 5,093,924 | 3/1992 | Toshiyuki et al. | 455/33 |
| 5,197,093 | 3/1993 | Knuth et al. | 379/61 |
| 5,235,632 | 8/1993 | Raith | 379/59 |
| 5,402,523 | 3/1995 | Berg | 455/33.4 |
| 5,475,677 | 12/1995 | Arnold et al. | 370/29 |
| 5,511,235 | 4/1996 | Duong et al. | 455/75 |
| 5,526,402 | 6/1996 | Dent et al. | 379/59 |
| 5,634,193 | 5/1997 | Ghisler | 455/33.2 |
| 5,838,733 | 11/1998 | Bruckert | 375/297 |
| 5,845,209 | 12/1998 | Iwata | 455/423 |
| 5,884,145 | 3/1999 | Haartsen | 455/63 |
| 5,898,928 | 4/1999 | Karlsson et al. | 455/450 |

FOREIGN PATENT DOCUMENTS

WO 96/34501  10/1996  WIPO.

OTHER PUBLICATIONS

PCT International Search Report dated May 4, 1999.

*Primary Examiner*—Daniel S. Hunter
*Assistant Examiner*—Meless Zewdu
*Attorney, Agent, or Firm*—Jenkens & Gilchrist, P.C.

[57] ABSTRACT

A telecommunications system and method is disclosed for providing adaptive channel allocation for indoor cellular systems, which utilizes interference measurements on both the down-link channels and the up-link channels. This can be accomplished by using a Stand Alone Dual Channel Scanner (SADCS) to assist indoor cellular systems in allocating traffic channels on the basis of interference from external systems, which measures both the up-link and the down-link at the same time. A number of SADCSs can be placed at strategically located points in the building to measure interference on a channel by channel basis, and to communicate the results to the indoor base station, which can then allocate traffic channels with high confidence of maintaining a good speech quality.

35 Claims, 3 Drawing Sheets

SYSTEM AND METHOD FOR ADAPTIVE CHANNEL ALLOCATION

BACKGROUND OF THE PRESENT INVENTION

1. Field of the Invention

The present invention relates generally to telecommunications systems and methods for avoiding channel interference between two cellular systems, and specifically to providing adaptive channel allocation for an indoor base station system to avoid channel interference with outside base station systems.

2. Background and Objects of the Present Invention

Cellular telecommunications is one of the fastest growing and most demanding telecommunications applications ever. Today it represents a large and continuously increasing percentage of all new telephone subscriptions around the world. Cellular networks have evolved into two different networks. The European cellular network uses the Global System for Mobile Communication (GSM) digital mobile cellular radio system. In the United States, cellular networks have traditionally been primarily analog, but recent advances have been incorporating digital systems within the analog networks. One such North American cellular network is the D-AMPS network, which is described hereinbelow.

With reference now to FIG. 1 of the drawings, there is illustrated a D-AMPS Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18.

Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MSC 14 is in communication with a Base Station (BS) 24. The BS is the physical equipment, illustrated for simplicity as a radio tower, that provides radio coverage to the geographical part of the cell 22 for which it is responsible.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The cell 22 can cover a wide geographical area, or alternatively, can consist of only a single building in which the Base Station System 24 is located within the building. For example, in high rise buildings, where such an indoor system 24 is likely to be implemented, the external channel interference to and from other outdoor Base Station Systems (not shown) can be high because the effective antenna heights are high. This is due to the fact that there is typically a direct line of sight between the indoor BS 24 and the outdoor BS (not shown), e.g., there are no buildings or hills obstructing the signals from each of the BSs. Therefore, in order to minimize channel interference, the indoor BS 24 must choose the best frequency for each traffic channel in the indoor system.

Currently, for an indoor system 24, the channels used for traffic channels are selected based on a scanning receiver that examines all of the up-link frequencies, e.g., the frequencies used by the MSs 20 to transmit voice and data to the BS 24, and chooses the frequencies with least interfering power. The up-link frequencies are continuously scanned and sorted according to least channel interference by the scanning receiver. Many MSs 20 can also scan the down-link frequencies, e.g., frequencies used by the BS 24 to transmit voice and data to the MSs 20, but the scanning is much slower and therefore, not as accurate.

For example, if the indoor cellular system 24 has 12.5 MHZ (416 channels) with twenty-one of those channels being control channels, e.g., channels used only for signaling, and the indoor system 24 needs twenty-five channels, a scan receiver (not shown) will scan 395 frequencies (416–21 control channels) on the up-link, choose the twenty-five frequencies with the minimum interference level and allocate those frequencies for the indoor traffic channels. Using both the scanning receiver for the up-link and the MS 20 for the down-link, the indoor base station system 24 sorts the twenty-five channels and allocates each call to the least noisy available channel.

However, this solution does not accurately account for the down-link interference, which typically is greater than the up-link interference, because on the down-link frequency, all three time slots (for D-AMPS systems) are transmitted even if only one conversation is occurring, e.g., only one MS 20 is connected on that frequency. This can result in up to three times the possibility for interference on the down-link frequency than on the up-link frequency, e.g., because the MS 20 will occupy only one time slot. In addition, the power (strength) of the down-link frequency is currently not able to be controlled, while many MSs 20 have, for example, 24 dB of power control for the up-link frequency. This results in the average interference level on the down-link being higher than the average interference level on the up-link. Furthermore, in high rise buildings, cellular phone users tend to go near a window in order to improve voice quality. However, in some cases, this may only increase the interference because they may be in line of sight with an outdoor interfering base station, which, of course, results in higher interference on the down-link.

It is therefore an object of the invention to provide adaptive channel allocation for indoor cellular systems based on both the down-link and the up-link channel interference.

SUMMARY OF THE INVENTION

The present invention is directed to telecommunications systems and methods for providing adaptive channel allocation for indoor cellular systems, which utilizes interference measurements on both the down-link frequencies and the up-link frequencies. This can be accomplished by using a Stand Alone Dual Channel Scanner (SADCS) to assist indoor cellular systems in allocating traffic channels on the basis of interference from external systems, which measures both the up-link and the down-link at the same time. A number of SADCSs can be placed at strategically located points in the building to measure interference on a channel by channel basis, and to communicate the results to the indoor base station, which can then allocate traffic channels with high confidence of maintaining a good speech quality. The advantage of the SADCS is that it will measure both the down-link and up-link channel interference at the same time to ensure a good ratio of signal strength to interference strength (C/I) on both links. Another advantage is the flexibility of locating the SADCS separate from the base station to allow the SADCS to be closer to the MSs. In addition, more than one SADCS can be connected to the base station to provide input on the interference in different locations throughout the building.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
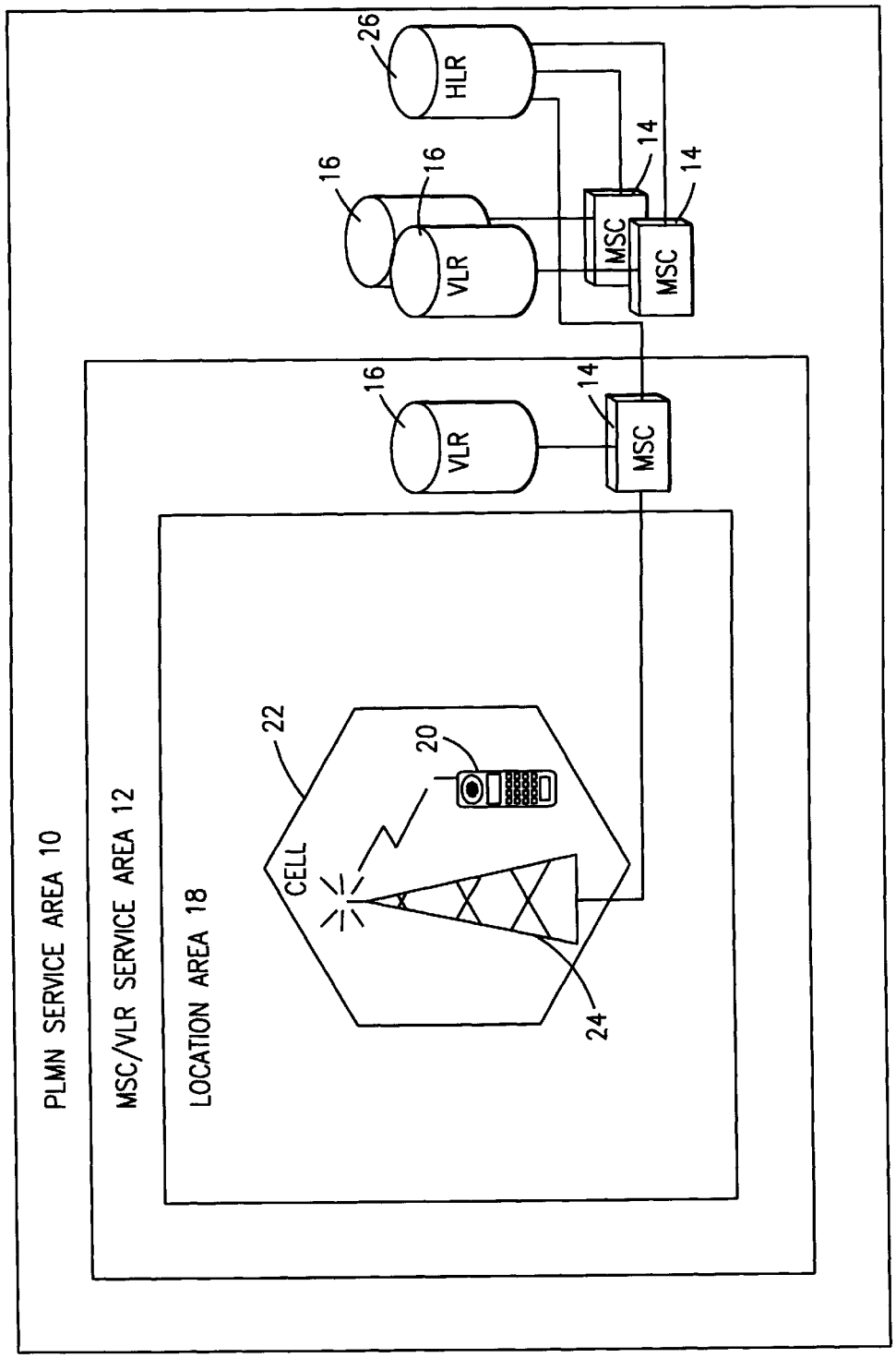
FIG. 1 is block diagram of a conventional terrestrially-based wireless telecommunications system.
Figure 2:
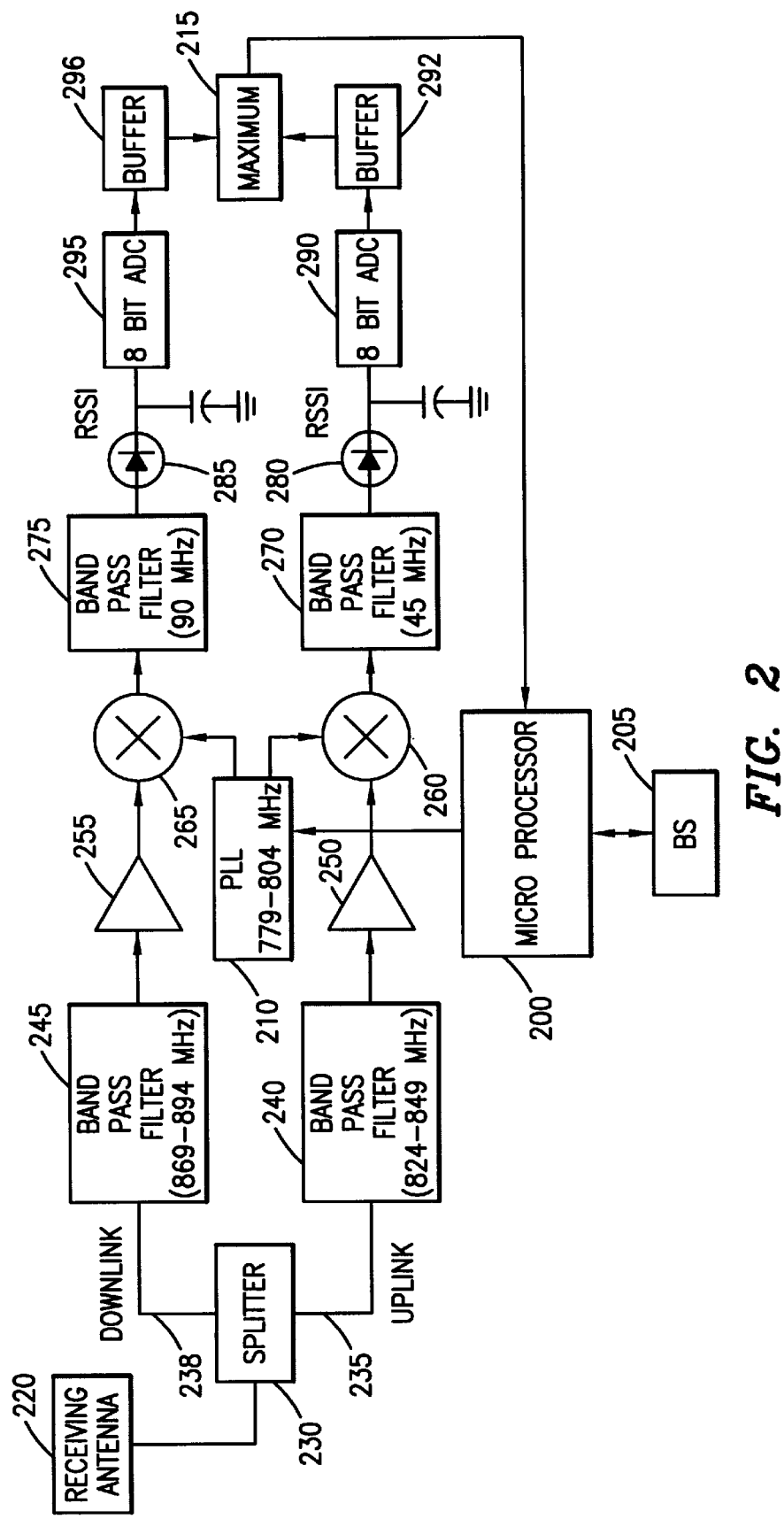
FIG. 2 is a block diagram illustrating a sample Stand Alone Dual Channel Scanner in accordance with preferred embodiments of the present invention.

With reference now to FIG. 2 of the drawings, a Stand Alone Dual Channel Scanner (SADCS) is illustrated, which simultaneously scans both down-link frequencies, e.g., frequencies used by serving Base Stations (BSs) to send voice and data to Mobile Stations (MS), and up-link frequencies, e.g., frequencies used by MSs to send voice and data to the serving BS, to determine traffic channels for use by an indoor BS with the least interference from outdoor BSs. The output of the SADCS is the highest power associated with either the down-link frequencies or the up-link frequencies. Advantageously, the SADCS can listen to both the up-link and the down-link at the same time using one synthesizer.

Initially, a microprocessor 200 receives a list of channels to scan, for example, channels 1 to 312, from the serving BS 205. Thereafter, the microprocessor 200 selects a channel and translates that channel number into the Phase Lock Loop (PLL) frequency, which is 45 MHZ below the up-link frequency, as is well understood in the art. For example, if the system is a D-AMPS system, for channel number 1, if the up-link frequency is 825.03 MHZ and the down-link frequency is 870.03 MHZ, the frequency sent by the microprocessor 200 to a Phase Lock Loop (PLL) block 210 will be 780.03 MHZ.

Thereafter, a receiving antenna 220 sends a signal containing all of the received up-link and down-link frequencies to a Splitter 230, which splits the signal into the respective up-link frequency 235 and down-link frequency 238 paths. The signals 235 and 238 then enter Band Pass Filters (240 and 245, respectively), which eliminate extraneous frequencies, e.g., for the down-link frequency path 245, frequencies outside of the 869–894 MHZ range are eliminated. These filtered frequencies are then amplified by a respective amplifier 250 and 255 and sent to a respective mixer 260 and 265, which have outputs of 90 MHZ for the down-link path 238 and 45 MHZ for the up-link path 235. The PLL 210 then selects the desired frequency for both the up-link path 235 and the down-link path 238, and the respective mixers 260 and 265 mix the frequency for the up-link path 235 down to 45 MHZ and the frequency for the down-link path 238 down to 90 MHZ. These frequencies are again filtered by Band Pass Filters (270 and 275, respectively) to eliminate any Inter-Modulation (IM) products.

The Receive Signal Strength Indicator (RSSI) stages 280 and 285 convert the strength (power) of each signal (235 and 238, respectively) from analog to digital, and the respective Analog to Digital Converter (ADC) stages 290 and 295 convert the digital signals to binary numbers. These binary numbers from each stage 290 and 295 are sent through respective buffers 292 and 296 and then input to a Maximum block 215, which chooses the maximum value from the up-link 235 and down-link 238 paths. For example, if the signal on the up-link path 235 is −105 dBm and the signal on the down-link 238 path is −97 dBm, then the output to the microprocessor 200 will be: Channel 1: −97 dBm. The same process is applied to each of the channels, with each value being sent to the serving BS 205. Thereafter, the BS 205 can select the channel with the least amount of interference, e.g., the channel with the lowest value, for channel allocation. With modifications to the filters and PLL frequencies, the same process can be applied to the 1900 MHZ band and the 800 MHZ band. It should be noted that the microprocessor 200 can be implemented within the BS 205 or can be a separate node.

Once the channel is allocated, the MS 20 monitors the interference on the allocated channel, and if excessive interference occurs, the MS 20 informs the BS 205 of the interference. The BS 205 then again determines the channel with the least interference, as described hereinabove, and allocates that channel to the MS 20.

Figure 3:
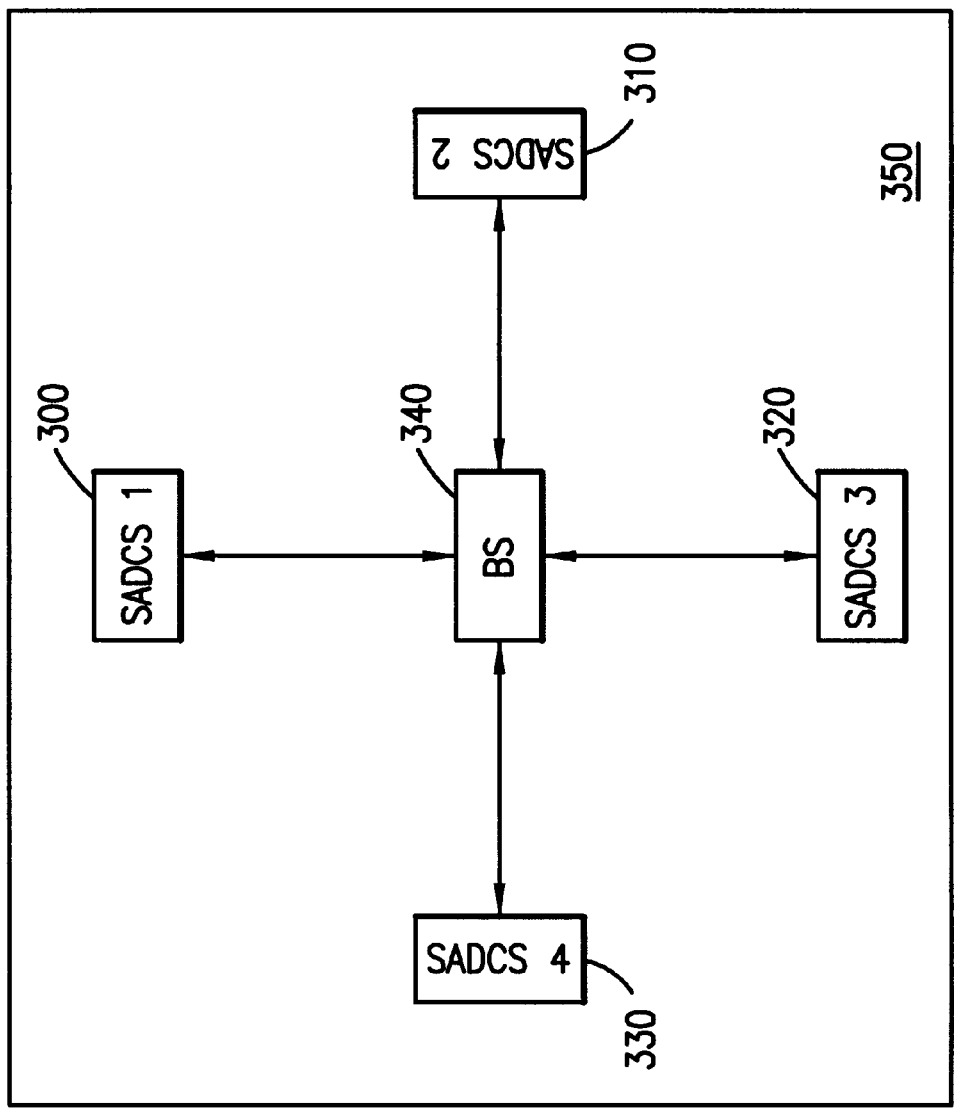
FIG. 3 schematically illustrates a sample strategical placement of Stand Alone Dual Channel Scanners within a building.

The SADCS is preferably located apart from the indoor base station system and communicates with the indoor base station system through a cable. This allows the SADCS to be placed near a window or in any strategic place with high traffic and/or high interference level. For example, if the building is a ten story rectangular building with windows, and assuming that the worst interference is on the tenth (top) floor, then, as shown in FIG. 3, it is preferable to locate four SADCSs (SADCS 1 300, SADCS 2 310, SADCS 3 320, and SADCS 4 330) on the tenth floor 350.

In order for the indoor Base Station (BS) 340 to determine which channel to use, it is necessary to know the minimum coverage of the BS 340, e.g., the minimum power which still gives good voice quality, and the maximum interference from outdoor systems. For example, if the minimum coverage in the building is −80 dBm, and there is no frequency reuse inside the building, in order to produce good voice quality in, for example, a D-AMPS system, a signal strength to interference strength (C/I) ratio of 20 dB or more is needed. If the results for one channel from each of the SADCSs placed around the building are: SADCS 1 300: −97 dBm, SADCS 2 310: −100 dBm, SADCS 3 320: −110 dBm, and SADCS 4 330: 195 dBm, the maximum interference level will be −97 dBm. Since the difference between −80 dBm (coverage level) and −97 dBm (interference level) is 17 dB, this is the worst C/I for this channel.

The Base Station 340 can then sort all of the channels according to the C/I ratio and can choose the channels with the best C/I ratio for use in the indoor system 340. In cases where some of the selected channels have a C/I ratio less than 20 dB, the Base Station 340 will notify the operator of which channels have a chance for not having good speech quality.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be understood that the aforementioned SADCS can be implemented in any cellular system, including, but not limited to a D-AMPS system, a Personal Communications System (PCS), or a Global System for Mobile Communication (GSM) system.

What is claimed is:

1. A telecommunications system for an indoor wireless system having a plurality of channels, each of said channels having a respective up-link frequency and down-link frequency associated therewith, said telecommunications system comprising:

a receiving antenna adapted to receive a plurality of frequencies associated with said indoor system;

at least one scanner connected to said receiving antenna and adapted to receive said plurality of frequencies from said receiving antenna, filter said plurality of frequencies to select said respective up-link and down-link frequencies associated with a given one of said plurality of channels, and measure an interference value for each of said selected up-link and down-link frequencies; and a base station within said indoor system, said base station being remotely connected via a cable to said scanner said base station being adapted to receive a highest one of said interference values associated with said at least one channel from said at least one scanner and determine a least interference one of said plurality of channels using said highest interference value.

2. The telecommunications system of claim 1, further comprising a microprocessor adapted to determine said given channel, receive said highest interference value and send said highest interference value to said base station.

3. The telecommunications system of claim 2, wherein said microprocessor determines a phase lock loop frequency associated with said given channel, said phase lock loop frequency being sent to a phase lock loop node within said scanner, said respective up-link and down-link frequencies associated with said given channel being selected using said phase lock loop node.

4. The telecommunications system of claim 3, wherein said phase lock loop frequency is 45 megahertz below said selected up-link frequency associated with said given channel.

5. The telecommunications system of claim 4, wherein said scanner further comprises a splitter, said receiving antenna being adapted to send said plurality of frequencies to said splitter, said splitter being adapted to split said plurality of frequencies into an up-link path and a down-link path, each of said up-link frequencies being on said up-link path, each of said down-link frequencies being on said down-link path.

6. The telecommunications system of claim 5, wherein said scanner further comprises first and second filters, said first filter being on said up-link path, said second filter being on said down-link path, said first and second filters being adapted to eliminate extraneous ones of said up-link and down-link frequencies respectively.

7. The telecommunications system of claim 6, wherein said scanner further comprises first and second amplifiers, said first amplifier being connected to said first filter, said second amplifier being connected to said second filter, said first and second amplifiers being adapted to amplify said filtered up-link and down-link frequencies respectively.

8. The telecommunications system of claim 7, wherein said scanner further comprises first and second mixers connected to said first and second amplifiers respectively, said phase lock loop node being connected to said first and second mixers, said phase lock loop node being adapted to select said up-link and down-link frequencies associated with said given channel, said first mixer adapted to mix said selected up-link frequency down to 45 megahertz, said second mixer adapted to mix said selected down-link frequency down to 90 megahertz.

9. The telecommunications system of claim 8, wherein said scanner further comprises third and fourth filters, said third filter being connected to said first mixer, said fourth filter being connected to said second mixer, said third and fourth filters being adapted to filter intermodulation products from said selected up-link frequency and said selected down-link frequency respectively.

10. The telecommunications system of claim 9, wherein said scanner further comprises first and second strength indicator stages connected to said third and fourth filters respectively adapted to measure said interference values associated with said selected up-link frequency and said selected down-link frequency, respectively.

11. The telecommunications system of claim 1, wherein said scanner comprises a maximum node adapted to determine said highest interference value.

12. The telecommunications system of claim 1, wherein said scanner is adaptive to determine additional interference values associated with additional ones of said channels and send said addition interference values to said base station, said least interference channel selected by said base station having the lowest value of said additional interference values and said highest interference value.

13. The telecommunications system of claim 1, further comprising second, third, and fourth scanners for determining second, third, and fourth interference values respectively, said base station determining said least interference channel using the highest of said highest, second, third and fourth interference values.

14. The telecommunications system of claim 1, further comprising a mobile terminal in wireless communication with said base station, said base station allocating said least interference channel for use by said mobile terminal.

15. A method for determining a least interference one of a plurality of channels within an indoor wireless system, each of said plurality of channels having an up-link frequency and a down-link frequency associated therewith, said method comprising the steps of:

determining, a given one of a plurality of said channels to be scanned;

transmitting a plurality of frequencies associated with said indoor system from a receiving antenna to at least one scanner;

selecting, by said scanner, said respective up-link and down-link frequencies associated with said given channel;

sending, a highest one of said interference values from said scanner to a base station within said indoor system and remotely connected to said scanner via a cable; and determining, by said base station, said least interference channel, using said highest interference value.

16. The method of claim 15, further comprising, after said step of determining said given channel, the steps of:

determining, a phase lock loop frequency associated with said given channel; and sending, said phase lock loop frequency to a phase lock loop node within said scanner, said step of selecting said respective up-link and down-link frequencies associated with said given channel being performed using said phase lock loop node.

17. The method of claim 16, wherein said phase lock loop frequency is 45 megahertz below said selected up-link frequency.

18. The method of claim 17, wherein said scanner further comprises a splitter, and further comprising, after said step of transmitting, the step of:

splitting, by said splitter, said plurality of frequencies into an up-link path and a down-link path, each of said up-link frequencies being on said up-link path, each of said down-link frequencies being on said down-link path.

19. The method of claim 18, wherein said scanner further comprises first and second filters, said first filter being on said up-link path, said second filter being on said down-link path, and further comprising, before said step of selecting, the step of:

filtering, by said first and second filters, extraneous ones of said up-link and down-link frequencies respectively.

20. The method of claim 19, wherein said scanner further comprises first and second amplifiers, said first amplifier being connected to said first filter, said second amplifier being connected to said second filter, and further comprising, after said step of filtering, the step of:

amplifying, by said first and second amplifiers, said filtered up-link and down-link frequencies respectively.

21. The method of claim 20, wherein said scanner further comprises first and second mixers connected to said first and second amplifiers respectively, said phase lock loop node being connected to said first and second mixers, said step of selecting being performed by said phase lock loop node selecting said respective up-link frequency and said respective down-link frequency associated with said given channel, and further comprising, after said step of selecting, the steps of:

mixing, by said first mixer, said selected up-link frequency down to 45 megahertz; and mixing, by said second mixer, said selected down-link frequency down to 90 megahertz.

22. The method of claim 21, wherein said scanner further comprises third and fourth filters, said third filter being connected to said first mixer, said fourth filter being connected to said second mixer, and further comprising, after said steps of mixing, the step of:

filtering, by said third and fourth filters, intermodulation products from said selected up-link frequency and said selected down-link frequency respectively.

23. The method of claim 22, wherein said scanner further comprises first and second strength indicator stages connected to said third and fourth filters respectively, said step of measuring said interference values associated with said selected up-link frequency and said selected down-link frequency being performed by said first and second strength indicator stages respectively.

24. The method of claim 15, further comprising, before said step of determining said least interference channel, the steps of:

determining, by said scanner, additional interference values associated with additional ones of said channels; and sending, said additional highest interference values from said scanner to said base station, said least interference channel having the lowest value of said additional interference values and said highest interference value.

25. The method of claim 15, further comprising, before said step of determining said least interference channel, the step of:

determining, by second, third, and fourth scanners, second, third, and fourth interference values respectively; and sending, by said second, third, and fourth scanners, said second, third, and fourth highest interference values respectively to said base station, said step of determining said least interference channel being performed by said base station using the highest of said highest, second, third and fourth interference values.

26. The method of claim 15, further comprising, after said step of determining said least interference channel, the step of:

allocating, by said base station, said least interference channel for use by a mobile terminal in wireless communication with said base station.

27. A scanner adapted to determine a highest interference value associated with a given one of a plurality of channels within an indoor wireless telecommunications system, said given channel having an up-link frequency and a down-link frequency associated therewith, said scanner comprising:

connection means for remotely connecting via a cable to a base station within said indoor wireless telecommunications system;

receiving means for receiving a signal comprising a plurality of frequencies associated with said indoor system;

a splitter for splitting said signal into up-link and down-link paths;

frequency selection means for selecting said up-link frequency associated with said given channel from said up-link path and said down-link frequency associated with said given channel from said down-link path;

interference measuring means for measuring a first interference value for said selected up-link frequency and a second interference value for said selected down-link frequency; and maximum selection means for selecting said highest interference value, said highest interference value being the maximum of said first and second interference values, said highest interference values being sent to said base station.

28. The scanner of claim 27, further comprising a phase lock loop node adapted to receive a phase lock loop frequency associated with said given channel, said frequency selection means comprising said phase lock loop node.

29. The scanner of claim 28, wherein said phase lock loop frequency is 45 megahertz below said selected up-link frequency.

30. The scanner of claim 29, further comprising first and second filters, said first filter being on said up-link path, said second filter being on said down-link path, said first and second filters being adapted to eliminate extraneous ones of said frequencies on said up-link and down-link paths respectively.

31. The scanner of claim 30, further comprising first and second amplifiers, said first amplifier being connected to said first filter, said second amplifier being connected to said second filter, said first and second amplifiers being adapted to amplify said filtered frequencies on said up-link and down-link paths respectively.

32. The scanner of claim 31, further comprising first and second mixers connected to said first and second amplifiers respectively, said phase lock loop node being connected to said first and second mixers, said frequency selection means comprising said phase lock loop node selecting said up-link frequency and said down-link frequency associated with said given channel, said first mixer being adapted to mix said selected up-link frequency down to 45 megahertz, said second mixer being adapted to mix said selected down-link frequency down to 90 megahertz.

33. The scanner of claim 32, further comprising third and fourth filters, said third filter being connected to said first mixer, said fourth filter being connected to said second mixer, said third and fourth filters being adapted to filter intermodulation products from said selected up-link frequency and said selected down-link frequency respectively.

34. The scanner of claim 33, wherein said interference measuring means comprises first and second strength indicator stages connected to said third and fourth filters respectively adapted to measure said first interference value associated with said selected up-link frequency and said second interference value associated with said selected down-link frequency respectively.

35. The scanner of claim 27, wherein said maximum selection means comprises a maximum node for determining said highest interference value.

* * * * *

UNITED STATES PATENT AND TRADEMARK OFFICE
CERTIFICATE OF CORRECTION

PATENT NO.   : 6,078,812
DATED        : June 20, 2000
INVENTOR(S)  : Yaron Mintz It is certified that error appears in the above-identified patent and that said Letters Patent is hereby corrected as shown below:

Column 6,
Line 54, replace "addition" with -- additional --

Signed and Sealed this

Sixteenth Day of October, 2001

Attest:

NICHOLAS P. GODICI
Attesting Officer   Acting Director of the United States Patent and Trademark Office